United States Patent
Arehart et al.

(10) Patent No.: US 9,582,447 B2
(45) Date of Patent: Feb. 28, 2017

(54) SYSTEM, APPARATUS, AND METHOD FOR MIL-STD-1553B COMMUNICATION ENFORCEMENT

(71) Applicant: The Aerospace Corporation, El Segundo, CA (US)

(72) Inventors: Alan B Arehart, Torrance, CA (US); Michael P Hernandez, Redfern (AU); John C Nilles, Ellicott City, MD (US)

(73) Assignee: The Aerospace Corporation, El Segundo, CA (US)

( * ) Notice: Subject to any disclaimer, the term of this patent is extended or adjusted under 35 U.S.C. 154(b) by 548 days.

(21) Appl. No.: 14/149,134

(22) Filed: Jan. 7, 2014

(65) Prior Publication Data

US 2015/0193369 A1    Jul. 9, 2015

(51) Int. Cl.
*G06F 3/00* (2006.01)
*G06F 13/40* (2006.01)
*G06F 13/16* (2006.01)

(52) U.S. Cl.
CPC ........... *G06F 13/4022* (2013.01); *G06F 13/16* (2013.01)

(58) Field of Classification Search
None
See application file for complete search history.

(56) References Cited

U.S. PATENT DOCUMENTS 5,325,359 A * 6/1994 Jordan ................ G06F 13/4027
370/463

OTHER PUBLICATIONS

Cisco, Catalyst 6500 Series Switch and Cisco 7600 Series Router Firewall Service Module Configuration Guide, 2006, Cisco, pp. 1-588.*
Department of Defense, "Interface Standard for Digital Time Division Command/Response Multiplex Data Bus," Sep. 21, 1978.

* cited by examiner

*Primary Examiner* — Cheng-Yuan Tseng
(74) *Attorney, Agent, or Firm* — LeonardPatel PC

(57) ABSTRACT

A switch configured to enforce MIL-STD-1553B communication protocol is provided. The protocol is a request-response protocol allowing a bus controller to send a request and a remote terminal to send a response. In one embodiment, the switch is configured to isolate communication between a bus controller and each remote terminal by blocking non-compliant communications issued from any remote terminal. The switch may also isolate communication preventing a first remote terminal from receiving communication from a second remote terminal when the communication is not addressed to the first remote terminal. In another embodiment, a system provides isolation for bus controller to remote terminal communications by using one-to-one pairings of bus controller terminals to remote terminals. The switch may select a particular bus-controller-terminal-to-remote-terminal pairing from amongst a plurality of bus-controller-terminal-to-remote-terminal pairings. In certain embodiments, the switch records and reports information regarding communications from remote terminals not complying with the MIL-STD-1553B protocol.

19 Claims, 13 Drawing Sheets

SYSTEM, APPARATUS, AND METHOD FOR MIL-STD-1553B COMMUNICATION ENFORCEMENT

FIELD

The present invention relates to communication enforcement and, more particularly, to communication enforcement of the MIL-STD-1553B protocol.

BACKGROUND

The MIL-STD-1553B data bus is a standard protocol for controlling communication between components on board a vehicle such as an aircraft or a space vehicle. In particular, MIL-STD-1553B is a protocol for a digital, command/response, time-division multiplexing data bus 100, as shown in FIG. 1. The components include a processing element called a bus controller 105 that sends commands to subsystems 115, 120 on board a vehicle. Subsystems 115, 120 include sensors, actuators, etc. Subsystems 115, 120 interface electronically with the data bus 100 via a remote terminal, where the remote terminal can be a separate line replaceable unit such as remote terminal 110 or can be part of a subsystem with an embedded remote terminal 120. The standard defines the physical medium (a shielded, twisted wire pair cable 125 in a bus topology with all components electronically interfaced to cable 125; redundant cables 130 may be used for fault-tolerance); its transmission bit rate (1 megabit/second); the types of allowed words (command words, status words, and data words); the format for words (16 bits per word, where the position of each bit conveys meaning, plus a 3 microsecond sync (i.e., 3 bits worth of time) and a parity bit for a total of 20 bit-times per word); and the defined sequences for communication. See, for example, FIGS. 2 and 3 for various types of transfer sequences and mode command sequences. Under MIL-STD-1553B, bus controller 105 always initiates commands, and the other components (e.g., remote terminal 110) respond to the commands. For example, if data is to be transmitted to remote terminal 110, bus controller 105 transmits a command (e.g., a 'receive' command) followed by data words to remote terminal 110. See, for example, FIGS. 1 and 2.

Because communication is relayed between bus controller 105 and subsystems 115, 120 using cable 125, bus controller 105 has to split communication between each subsystem 115, 120 according to time. For example, for the first few hundred microseconds, bus controller 105 may communicate with subsystem 115 and, for the next few hundred microseconds, bus controller 105 may communicate with subsystem 120. Under MIL-STD-1553B, after bus controller 105 sends a command to, for example, remote terminal 110, bus controller 105 waits for a response from remote terminal 110 before sending another command to, for example, subsystem 120.

However, a problem associated with MIL-STD-1553B protocol is that MIL-STD-1553B is a protocol of trust. That is, each component and terminal is expected to follow the protocol, but there is nothing about the layout (topology) of bus cable 125, 130 to prevent a component from doing something not allowed by the protocol, such as sending a message out of turn or sending an incorrectly formatted message.

Thus, an improved way to regulate protocol components may be beneficial.

SUMMARY

Certain embodiments of the present invention may provide solutions to the problems and needs in the art that have not yet been fully identified, appreciated, or solved by current enforcement systems implementing the MIL-STD-1553B protocol. For example, in some embodiments, a switch may be situated between the bus controller and each remote terminal to isolate communication between the bus controller and each of the remote terminals. In other embodiments, bus controller and remote terminal communication can be isolated from another bus controller and another remote terminal communication by situating a switch in front of a plurality of one-to-one pairings of a bus controller terminal to a remote terminal. This allows the switch to prevent communication from the remote terminal when the remote terminal communicates out of turn.

In one embodiment, an apparatus is provided. The apparatus includes a switch situated between a bus controller and a plurality of remote terminals. The switch is configured to block non-compliant communication issued from at least one of the plurality of remote terminals.

In another embodiment, an apparatus is provided. The apparatus includes a plurality of bus controller terminals. Each of the plurality of bus controller terminals is associated with a bus controller processor and memory (BCPM) and one of a plurality of remote terminals. Further, each of the plurality of bus controller terminals is configured to isolate communication between the BCPM and each of the plurality of remote terminals to prevent non-compliant communication to the BCPM.

In yet another embodiment, an apparatus is provided. The apparatus includes a switch configured to isolate communication between a bus controller and each of a plurality of remote terminals to prevent any remote terminal from communicating out of turn. The switch is further configured to route communication between the bus controller and an intended remote terminal.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to a switch that isolates a bus controller and remote terminal communication to prevent a remote terminal from communicating out of turn, sending MIL-STD-1553B invalid communications, or sending MIL-STD-1553B illegal communications. These communications can be considered as non-compliant communications.

Non-compliant communications may include unwarranted communications, invalid communications, illegal communications, or a combination thereof. Unwarranted communications may include a communication from a first remote terminal that occurs without the first remote terminal having received a recent communication from a bus controller (since the MIL-STD-1553B protocol is a command/response protocol in which the bus controller initiates communication). Invalid communications may include words that do not conform to the expected word representation (e.g., noise). Illegal communications may include valid words that contain misinformation. It should be appreciated that in the MIL-STD-1553B protocol, valid words begin with a valid sync field, use bits in a valid Manchester II code, contain an information field with 16 bits, end with a parity bit, and use odd parity. Illegal communications may be valid words emanating from a first remote terminal containing incorrect information (e.g., a status word identifying the emanating remote terminal as a second remote terminal, or a status word indicating that 16 data words will follow when in fact 17 data words are sent).

This allows for enforcement of MIL-STD-1553B communication protocol. For instance, protocol components may be regulated by only allowing messages to be exchanged in a correct sequence and with correct formatting, and, if a message does not conform to MIL-STD-1553B protocol parameters, the message may be prevented from being forwarded to a bus controller or other terminals.

Figure 4:
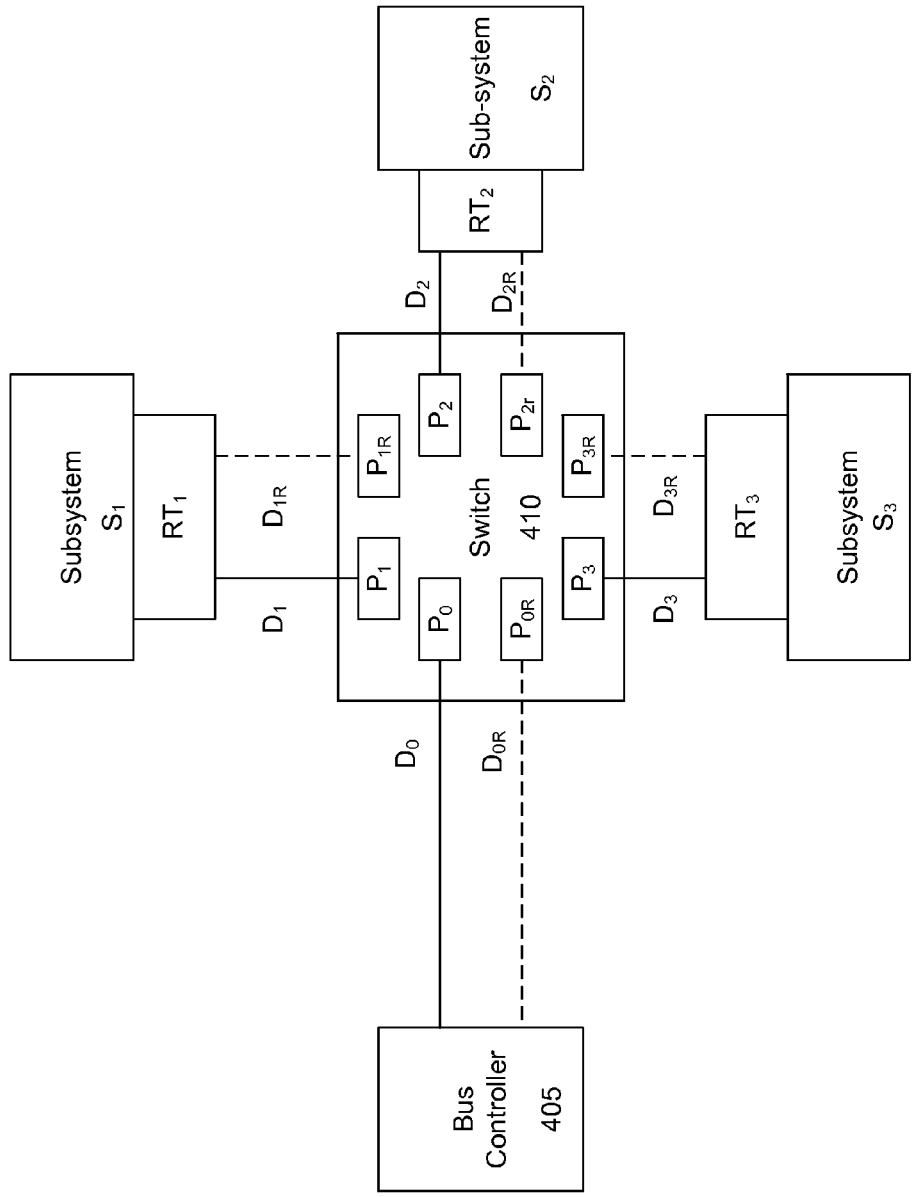
FIG. 4 is a block diagram illustrating a bus controller—remote terminal communication system, according to an embodiment of the present invention.

FIG. 4 is a block diagram 400 illustrating a bus controller—remote terminal communication system, according to an embodiment of the present invention. In this embodiment, a switch 410 is situated between bus controller 405 and remote terminals $RT_1$, $RT_2$, $RT_3$ to isolate communication between bus controller 405 and each of remote terminals $RT_1$, $RT_2$, $RT_3$. A more detailed explanation of how switch 410 isolates communication is described below.

In this embodiment, switch 410 includes a plurality of ports $P_0$, $P_1$, $P_2$, $P_3$. Each port $P_0$, $P_1$, $P_2$, $P_3$ is mapped to, or associated with, one of either bus controller 405 or one of a plurality of remote terminals $RT_1$, $RT_2$, $RT_3$. In this example, the mapping within switch 410 operates under the following assumption: port $P_0$ connects via an isolated communication path $D_0$ to bus controller 405; port $P_1$ connects via an isolated communication path $D_1$ to remote terminal $RT_1$; port $P_2$ connects via an isolated communication path $D_2$ to remote terminal $RT_2$; and port $P_3$ connects via an isolated communication path $D_3$ to remote terminal $RT_3$.

The mapping of ports $P_0$, $P_1$, $P_2$, $P_3$ allows switch 410 to determine where to route information, and from where to expect to receive information. It should be appreciated that the mapping can be purely physical (i.e., an end-user must connect, for example, remote terminal $RT_1$ to port $P_1$) or the mapping can be established with some logic (i.e., an end-user can program the switch to realize that port $P_1$ is mapped to a remote terminal with an address of, for example, '3' for remote terminal $RT_3$). Because each port $P_0$, $P_1$, $P_2$, $P_3$ is mapped, switch 410 can identify a source of non-compliant communication.

In certain embodiments, redundant communication (data) paths $D_{0R}$, $D_{1R}$, $D_{2R}$, $D_{3R}$ are provided between switch 410 and bus controller 405 and remote terminals $RT_1$, $RT_2$, $RT_3$. The redundant data paths are configured to provide a fault tolerance mechanism. For instance, in FIG. 4, redundant communication paths $D_{0R}$, $D_{1R}$, $D_{2R}$, $D_{3R}$ are connected to redundant ports $P_{0R}$, $P_{1R}$, $P_{2R}$, $P_{3R}$ to allow for fault tolerance.

In certain embodiments, switch 410 routes a first communication issued by bus controller 405 to each remote terminal $RT_1$, $RT_2$, $RT_3$. The first communication may identify an intended remote terminal (e.g., $RT_1$), thereby instructing switch 410 to permit communication between bus controller 405 and the intended remote terminal. Switch 410 is further configured (1) to route a response (or second communication) from the intended remote terminal to bus controller 405, one of a plurality of remote terminals (e.g., $RT_2$ or $RT_3$), or a combination thereof, and (2) to block non-compliant communication issued by unintended remote terminals (e.g., $RT_2$ or $RT_3$). Because switch 410 uses the first communication to identify the intended remote terminal, switch 410 can determine when a communication is issued by any unintended remote terminal in order to block the non-compliant communication.

Figure 5:
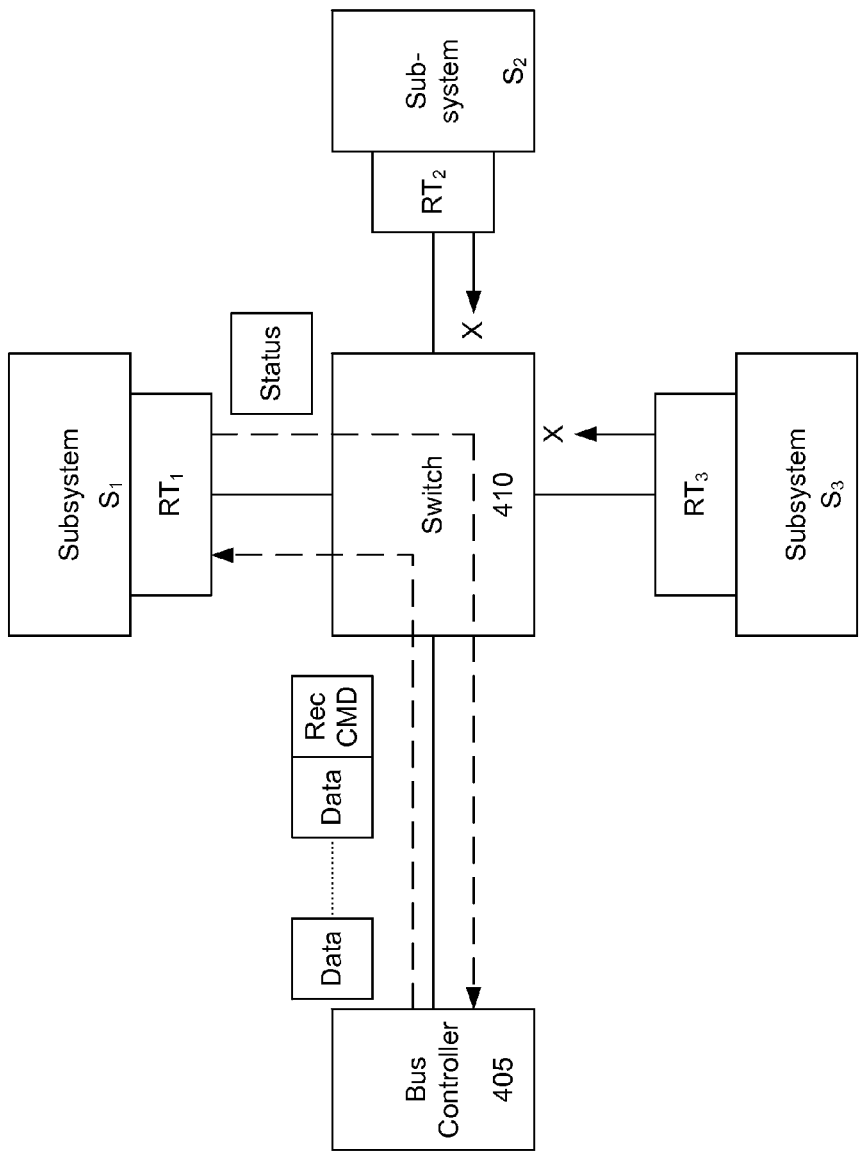
FIG. 5 is a block diagram illustrating a bus controller—remote terminal communication system for a remote terminal to receive data words, according to an embodiment of the present invention.

FIG. 5 shows one example of switch 410 preventing remote terminals $RT_2$, $RT_3$ from communicating unless instructed by bus controller 405. In other words, when bus controller 405 and remote terminal $RT_1$ are communicating, switch 410 blocks data communications transmitted from remote terminals $RT_2$, $RT_3$ to bus controller 405. The following paragraphs provide a more detailed description of the example.

For the first communication in FIG. 5, bus controller 405 transmits a 'receive' command along with data words intended for remote terminal $RT_1$ via switch 410. Switch 410 reads the 'receive' command and routes the 'receive' command along with the data words to remote terminal $RT_1$.

When in conformance with the MIL-STD-1553B protocol, remote terminal $RT_1$ begins transmitting a second communication (a status word) within 4 to 12 microseconds after remote terminal $RT_1$ receives the last data word transmitted from bus controller 405.

During this communication process, if remote terminals $RT_2$, $RT_3$ attempt to communicate with bus controller 405, switch 410 may block communication from remote terminals $RT_2$, $RT_3$ and record information regarding the attempted communication from remote terminals $RT_2$, $RT_3$. This allows bus controller 405 to request switch 410 to provide information regarding any such attempted (non-compliant) communication.

The following are examples of information that switch 410 may provide when requested by bus controller 405: (1) number of unwarranted status messages received by switch 410 from a plurality of remote terminals since the time of the last bus controller request; (2) the length of time invalid communication (e.g., noise) has been detected; (3) the addresses of the remote terminals that have sent unwarranted status messages; (4) the addresses of the remote terminals that have sent invalid communication (e.g., noise) (5) the bit format of a recent unwarranted communication; (6) indications that the number of expected data words in a response was exceeded (i.e., an illegal communication); (7) indications that the address reported in the status word did not match the remote terminal known to be physically connected to a particular switch port (i.e., another illegal communication); and (8) the times and/or amount of recent non-compliant communications.

To have the ability to provide different types of data, switch 410 may receive two successive commands from bus controller 405 to first identify the type of data requested and then to receive the proper number of data words to describe the requested type of data. That is, the first command from bus controller 405 is a 'receive' command word followed by a plurality of data words, where the plurality of data words specifies the type of data switch 410 should send; the second command word from bus controller 405 is a 'transmit' command word in which the command word requests the switch to send an expected number of data words.

Figure 1:
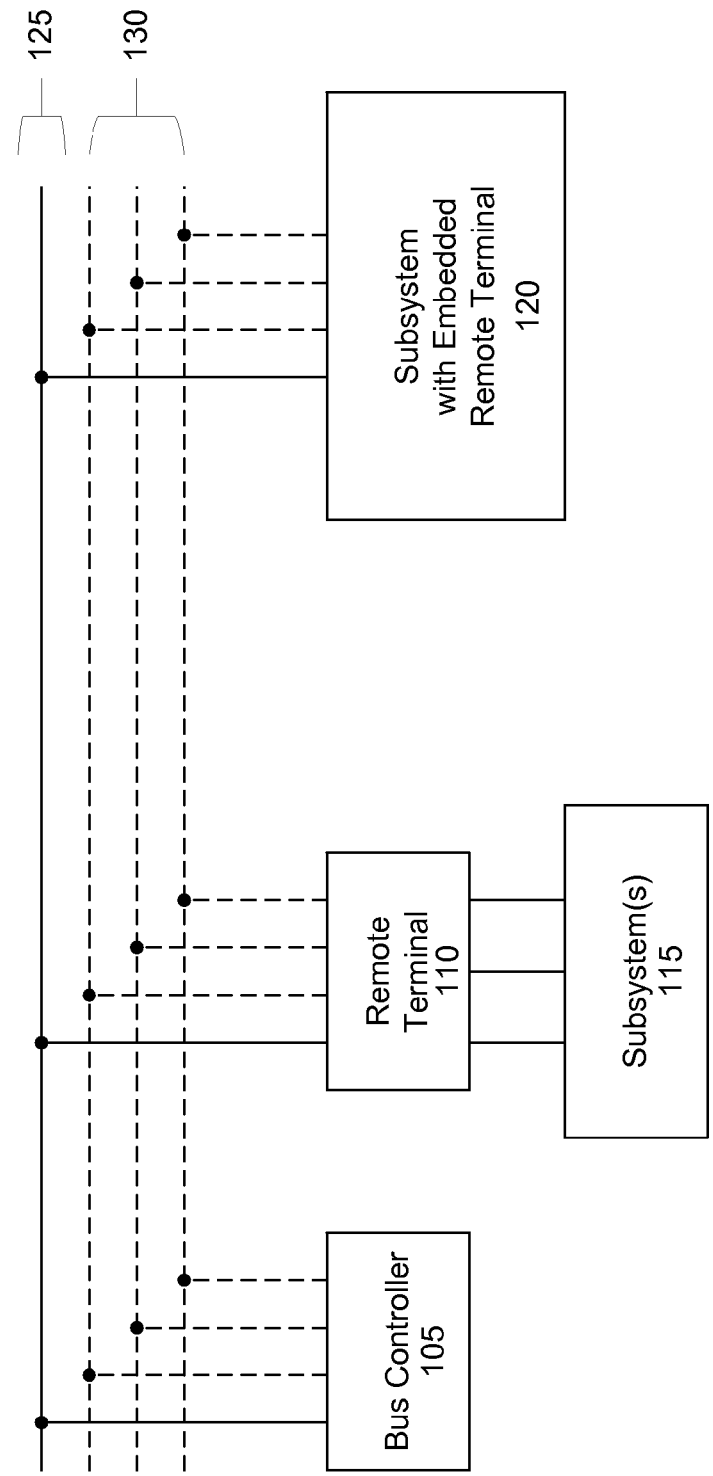
FIG. 1 is a block diagram illustrating a bus.

It should be appreciated that a command word issued by bus controller 405 includes 20 bit-times (with a bit rate of 1 bit/microsecond). The first three bit-times help synchronize the time, the next five bit-times include the address of the intended remote terminal, the next bit-time indicates whether the command is for the remote terminal to receive or transmit, the next five bit-times after that include the sub-address of subsystem $S_1$, the next five bit-times following that include the word count, and the last bit-time is for parity. It should be noted that at the transmission rate of 1 bit per microsecond, it will take switch 410 8 microseconds to read the first 8 bit-times of the command (i.e., the three bit-time sync plus the five address bits) to determine where to route the message. For example, if switch 410 waited until it read the address before forwarding the command so that the command went only to the intended remote terminal (say, remote terminal $RT_1$), there would be at least an 8 microsecond delay in the command reaching intended remote terminal $RT_1$. However, MIL-STD-1553B requires intended remote terminal $RT_1$ to respond (i.e., start sending a status word) within a response window of 4 to 12 microseconds after bus controller 405 finishes its transmission. Since a remote terminal designed for the bus topology of FIG. 1 may already be taking 4 to 12 microseconds before it responds, an additional delay of 8 microseconds from switch 410 may cause intended remote terminal $RT_1$ to miss its response window, which will result in bus controller 405 assuming that remote terminal was non-responsive.

Figure 6:
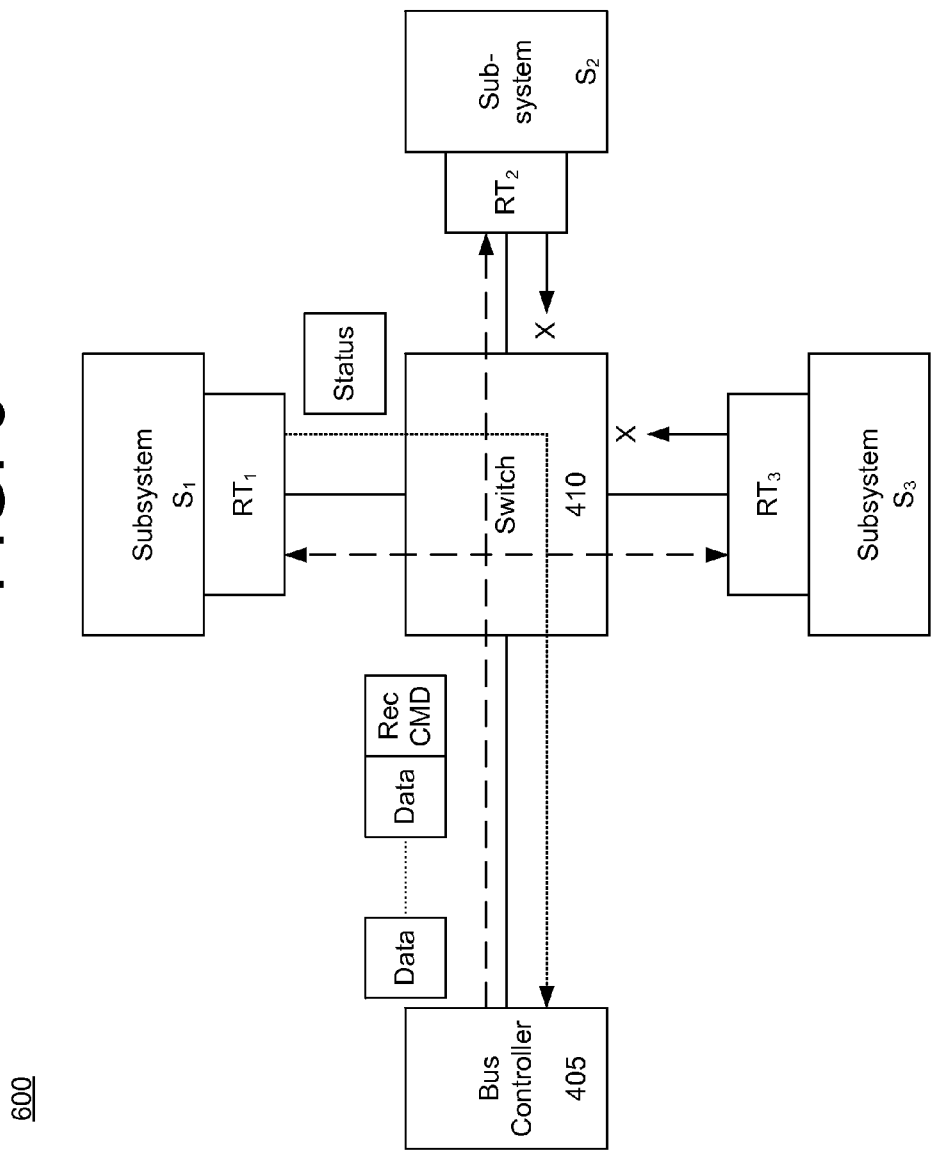
FIG. 6 is a block diagram illustrating a bus controller—remote terminal communication system for a remote terminal to receive data words, according to an embodiment of the present invention.

To maintain the correct time flow without changing the MIL-STD-1553B protocol, when a communication is issued by bus controller 405, the communication passes through switch 410 to each remote terminal $RT_1$, $RT_2$, $RT_3$. See, for example, FIG. 6. In FIG. 6, the dashed lines represent the communication passing through switch 410 to each remote terminal $RT_1$, $RT_2$, $RT_3$. The absence of a switch-induced delay provides an intended remote terminal, say remote terminal $RT_1$, with sufficient time to send its response within the specified window of 4 to 12 microseconds after bus controller 405 finishes its transmission.

Switch 410 determines intended remote terminal $RT_1$ before bus controller 405 finishes its transmission and before switch 410 expects a response from intended remote terminal $RT_1$. Switch 410 in this embodiment determines intended remote terminal $RT_1$ by the $8^{th}$ microsecond of a command, whereas a command may take 20 microseconds before the command is complete, and often the command will be accompanied by a set of data words, which will add to the transmission time. Because of the determination of intended remote terminal $RT_1$ before an expected response, if other remote terminals $RT_2$, $RT_3$ communicate instead of intended remote terminal $RT_1$, switch 410 is configured to block such non-compliant communication issued by other remote terminals $RT_2$, $RT_3$.

Moreover, because switch 410 uses a clock to clock bits in and out, switch 410 can count the microseconds since bus controller 405 finishes its transmission. This may allow switch 410 to block communication even from an intended remote terminal $RT_1$ if the response starts outside of the expected response window. For example, in this embodiment, when the response starts before 4 microseconds after bus controller 405 finishes its transmission, or when the response starts 12 microseconds after bus controller 405 finishes its transmission, switch 410 is configured to block communication from intended remote terminal $RT_1$.

FIG. 6 also shows an example of switch 410 blocking responses from unintended remote terminals $RT_2$, $RT_3$ and passing responses from intended remote terminal $RT_1$. In this example, if either remote terminal $RT_2$ or $RT_3$ communicates instead of intended remote terminal $RT_1$, switch 410 is configured to block the communication and record the blocked communication. Further, because switch 410 has had sufficient time to read the command from bus controller 405, switch 410 can route the response communication (e.g., status word) from intended remote terminal $RT_1$ to bus controller 405 when intended remote terminal $RT_1$ issues the status word.

Because a MIL-STD-1553B 'receive' command issued by bus controller 405 identifies the number of data words to be sent from bus controller 405 to the remote terminal (e.g., $RT_1$), switch 410 is configured to count the number of data words as the data words are being sent. This allows switch 410 to block a status word issued (prematurely) by remote terminal $RT_1$ if the last data word has not yet been routed to remote terminal $RT_1$. In other words, if remote terminal $RT_1$ issues a status word prior to receiving the last data word, switch 410 is configured to block the status word from reaching bus controller 405 and is further configured to record the communication.

Figure 7:
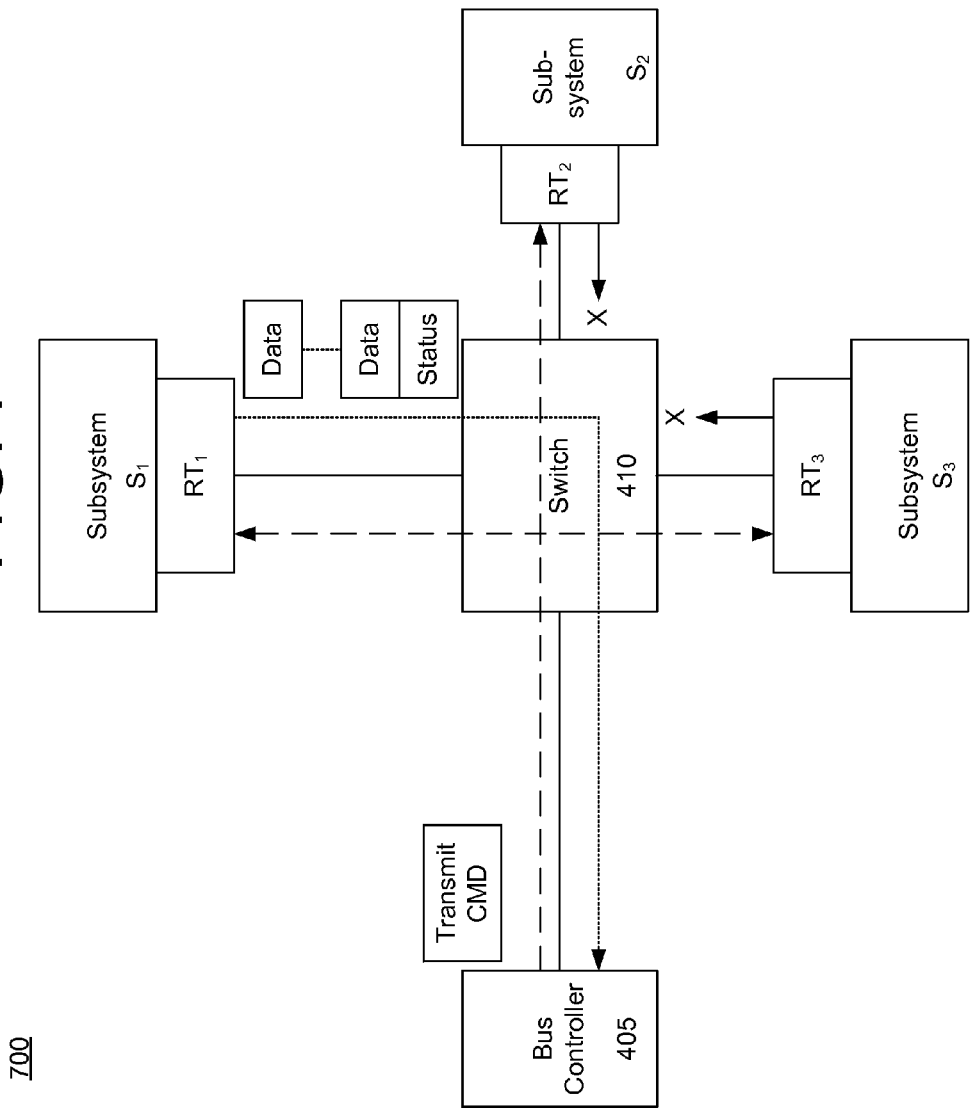
FIG. 7 is a block diagram illustrating a bus controller—remote terminal communication system for a remote terminal to transmit data words to a bus controller, according to an embodiment of the present invention.

Further, because a MIL-STD-1553B 'transmit' command identifies the number of data words that are to be sent from remote terminal $RT_1$ to bus controller 405, switch 410 is configured to block any additional data words sent by remote terminal $RT_1$ that are beyond the number indicated in the command. For instance, if the command indicated that 16 data words are to be transmitted and the switch 410 counts 17 data words from remote terminal $RT_1$, then switch 410 is configured to block the 17$^{th}$ data word. See, for example, FIG. 7, which shows an example where the 'transmit' command requests a specific number of data words from remote terminal $RT_1$ and switch 410 would block data words sent from $RT_1$ in the event that the number of data words exceeded the requested number In FIG. 7, bus controller 405 transmits a command for remote terminal $RT_1$ to transmit data words back to bus controller 405. Switch 410 allows the command to pass through to each remote terminal $RT_1$, $RT_2$, $RT_3$. By the time switch 410 receives the status word from remote terminal $RT_1$, switch 410 has read the information contained in the command, i.e., the intended terminal, the number of data words to be routed, the transmission type (e.g., the remote terminal to receive or transmit data words), etc. In this embodiment, switch 410 is configured to receive and route the status word along with the data words to bus controller 405. However, as discussed above, because switch 410 knows the number of data words to be routed to bus controller 405, if remote terminal $RT_1$ attempts to transmit additional data words than what are identified in the command, then switch 410 will block the additional data words from being routed to bus controller 405. Further, if remote terminals $RT_2$, $RT_3$ communicate out of turn, switch 410 is configured to block the communication and record the blocked communication in its memory (not shown).

Figure 8:
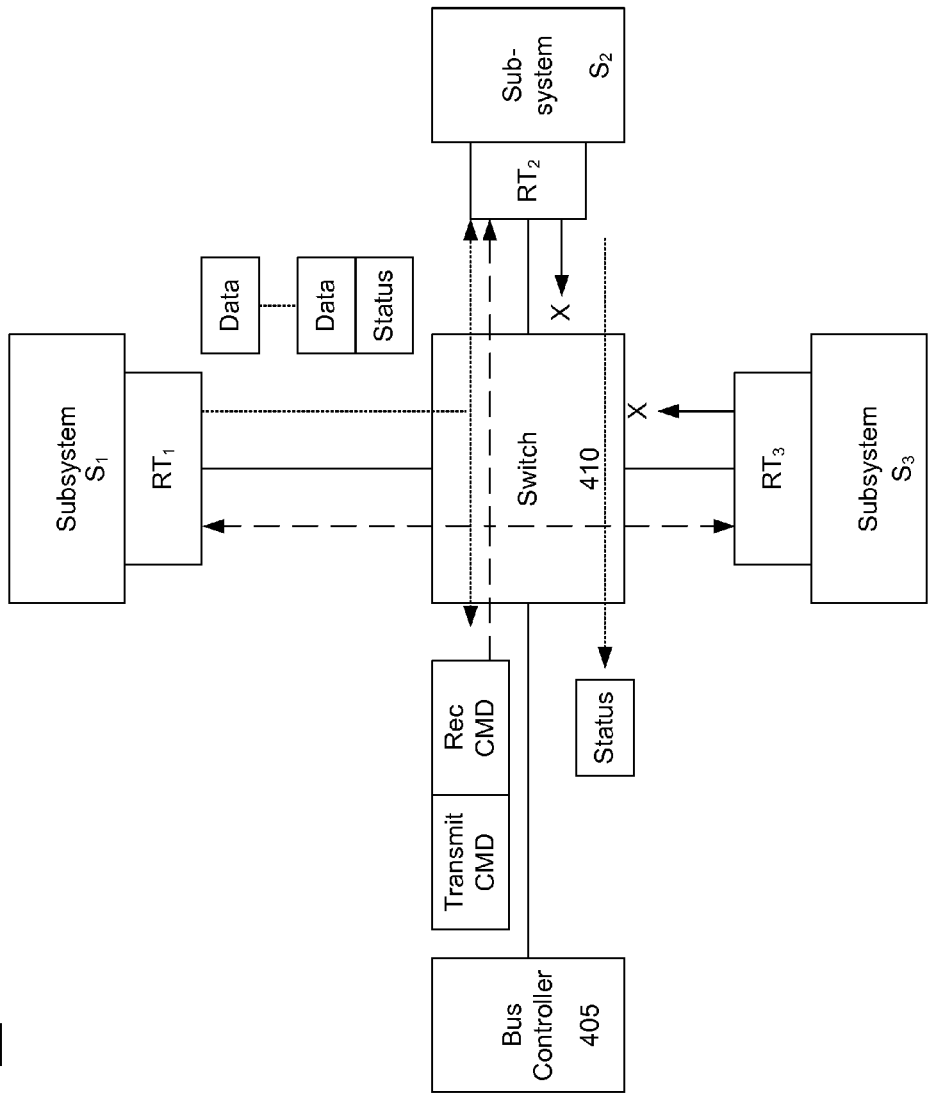
FIG. 8 is a block diagram illustrating a bus controller—remote terminal communication system for a remote terminal to transmit data words to another remote terminal, according to an embodiment of the present invention.

It should be appreciated that in some embodiments, a remote terminal may want to communicate with another remote terminal. For instance, in FIG. 8, bus controller 405 issues a receive command along with a transmit command. In this embodiment, the receive command instructs remote terminal $RT_2$ to receive data from remote terminal $RT_1$, and the transmit command instructs remote terminal $RT_1$ to transmit data to remote terminal $RT_2$. Switch 410 routes the receive command and transmit command to each remote terminal $RT_1$, $RT_2$, $RT_3$, as shown by the dashed lines in FIG. 8. Remote terminal $RT_1$, after 4 to 12 microseconds of receiving the transmit command, transmits the status word following by the data words.

As discussed above, because switch 410 routes the transmit command and receive command to each remote terminal $RT_1$, $RT_2$, $RT_3$, switch 410 has sufficient time to determine the intended destination to route the status word and the data words. In this case, switch 410 routes the status word along with the data words to remote terminal $RT_2$ and bus controller 405. This allows bus controller 405 to realize that the status word and data words from remote terminal $RT_1$ are transmitting as normal.

In this example, in the event that remote terminal $RT_3$ issues any communication during this process, the communication will be blocked and recorded by switch 410. Further, if remote terminal $RT_2$ issues a communication before the last data word is received by remote terminal $RT_2$, such communication will be also blocked by switch 410. Once remote terminal $RT_2$ receives the last data word, remote terminal $RT_2$ then issues a status word that will be transmitted to bus controller 405 via switch 410. It should be noted that switch 410 does not transmit the status word to the other remote terminals.

Figure 2:
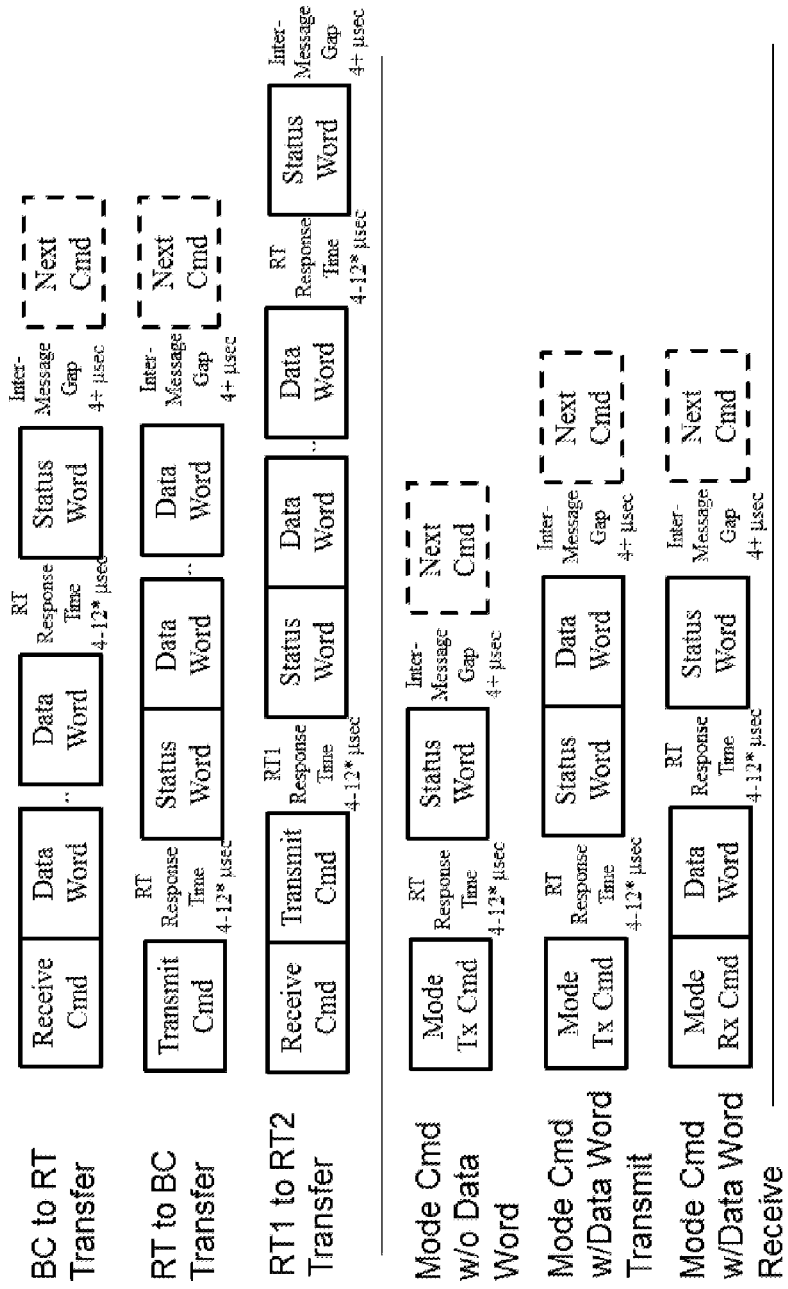
FIG. 2 illustrates transfer formats.

It should be appreciated that switch 410, as described with respect to FIGS. 4-8, is configured to perform similar functions for mode commands or broadcast commands issued by bus controller 405. Mode commands are defined by MIL-STD-1553B as commands used to communicate with the multiplex bus related hardware and to assist in the management of information flow instead of being used to extract data from or feed data to a functional subsystem. Per FIG. 2, a mode command can be used to command a remote terminal to receive an accompanying data word or to transmit a data word in addition to a status word. Moreover, a mode command can be used without an accompanying data word at all.

Figure 3:
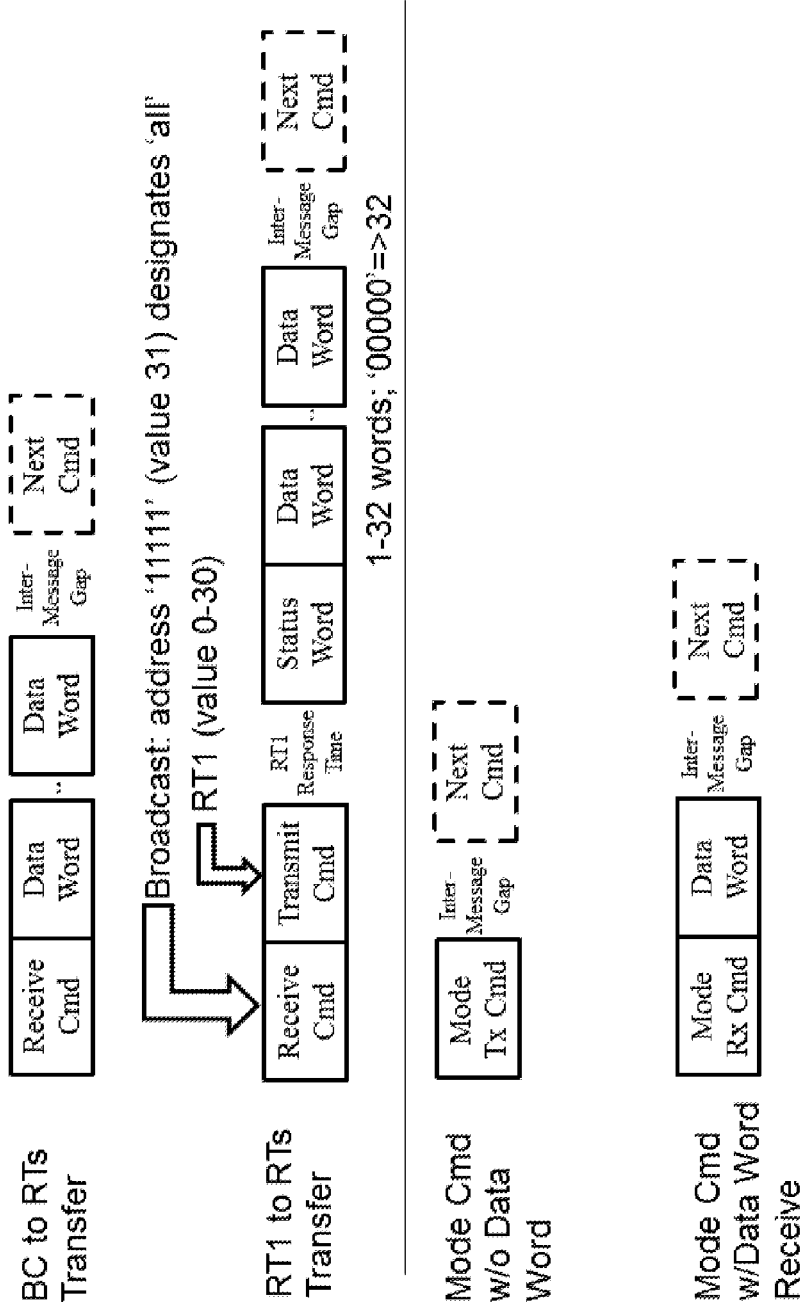
FIG. 3 illustrates broadcast transfer formats.

Broadcast commands are used by a bus controller to simultaneously communicate with all remote terminals. Per FIG. 3, a broadcast command can be used to instruct all remote terminals to receive a plurality of data words from the bus controller, to receive a plurality of data words from a remote terminal, to receive a mode command from the bus controller, or to receive a mode command with an associated data word from the bus controller.

Figure 9:
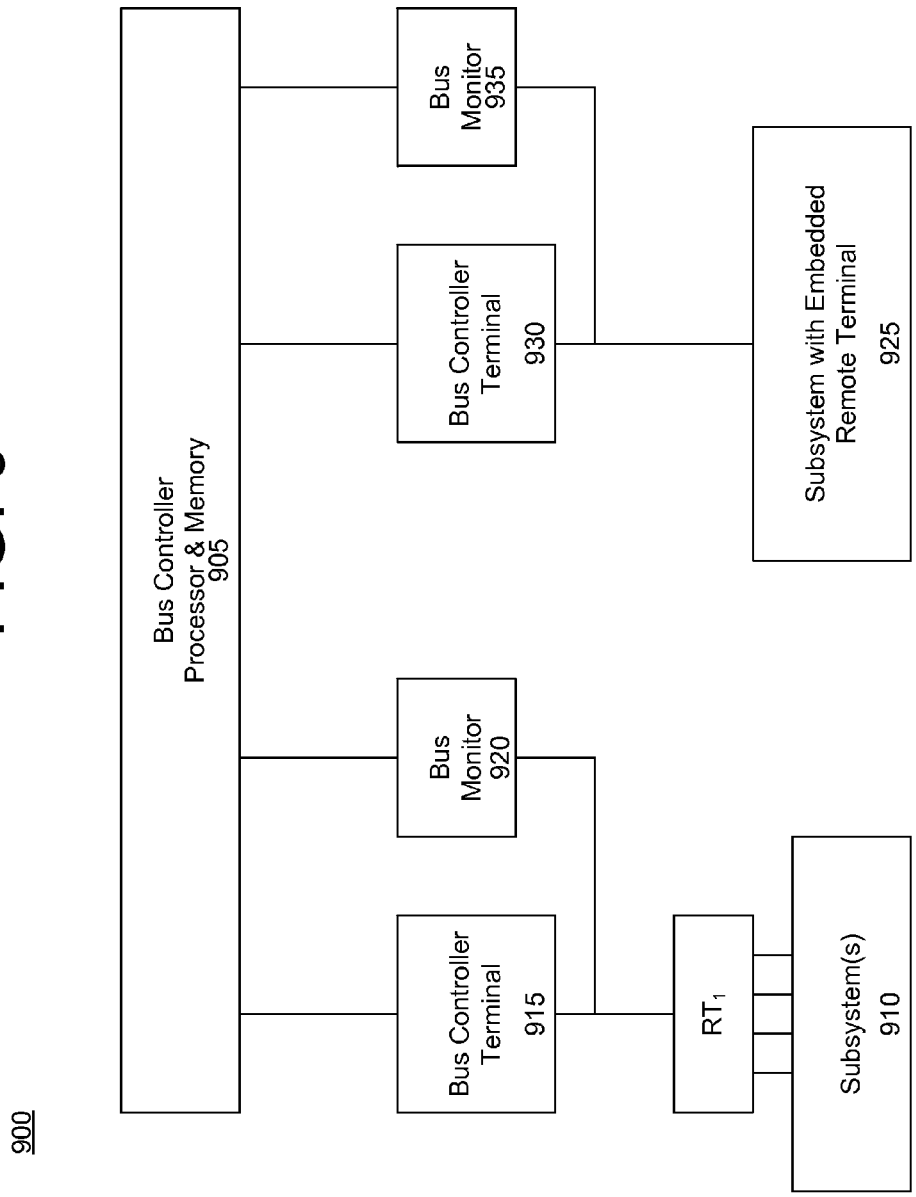
FIG. 9 is a block diagram illustrating a bus controller—remote terminal communication system, according to an embodiment of the present invention.

FIG. 9 is a block diagram 900 illustrating a bus controller—remote terminal communication system, according to an embodiment of the present invention. In this embodiment, interfaced between bus controller processor & memory (hereinafter "BCPM") 905 and remote terminal $RT_1$ are a bus controller terminal 915 and bus monitor 920. Similarly, interfaced between BCPM 905 and subsystem 925 are a bus controller terminal 930 and bus monitor 935. Subsystem 925 in this embodiment uses an embedded remote terminal to interface with a cable that interfaces with bus controller 930 and bus monitor 935. It should be appreciated that, in accordance with MIL-STD-1553B, a remote terminal, e.g., $RT_1$, may be an interface for more than one subsystem. A person of ordinary skill in the art would readily appreciate that BCPM 905 may include ports and similar logic functions as described above with respect to FIG. 4.

In this embodiment, the bus controller functionality is split between BCPM 905 and a bus controller terminals 915, 930. BCPM 905 may be responsible for bus controller logic, including decisions as to whether to accept a communication as compliant or non-compliant. Bus controller terminals 915, 930 may be responsible for writing words in a valid electronic format for communications on a cable with remote terminal $RT_1$ or subsystem 925.

Figure 10:
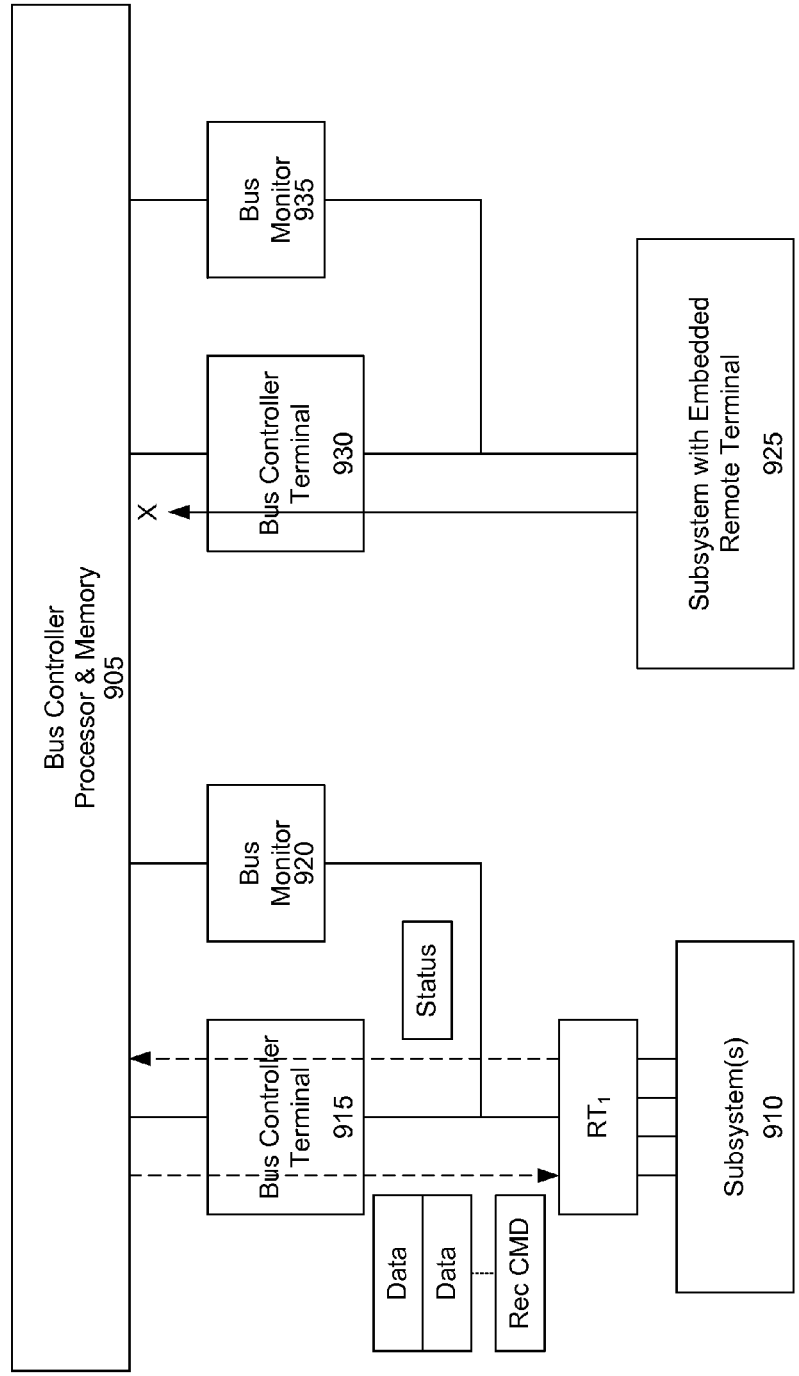
FIG. 10 is a block diagram illustrating a bus controller—remote terminal communication system for a remote terminal to receive data words, according to an embodiment of the present invention.

FIG. 10 is a block diagram 1000 illustrating a bus controller—remote terminal communication system for a remote terminal to receive data words, according to an embodiment of the present invention. In this embodiment, BCPM 905 transmits, via bus controller terminal 915, a receive command along with data words to remote terminal $RT_1$. It should be appreciated that BCPM 905 may have similar functionality to switch 410 described above. The receive command informs remote terminal $RT_1$ that it will receive data words from BCPM 905. Upon receipt of all of the data words, remote terminal $RT_1$ transmits a status word back to BCPM 905 through bus controller terminal 915. Bus monitor 920 may record the transmission of the receive command along with the data words, as well as the status word issued by remote terminal $RT_1$.

If, for example, subsystem 925 transmits a word without first having received a command from BCPM 905 via bus controller terminal 930, then bus controller terminal 930 may pass the unwarranted communication to BCPM 905, and logic within BCPM 905 may detect that the communication is unwarranted. This allows BCPM 905 to record the unwarranted communication (i.e., the communication itself, details of the communication, or both), and/or preclude (or block) the communication from being acted upon. For example, BCPM 905 may preclude the unwarranted communication from being communicated to remote terminal $RT_1$ or bus controller terminal 915.

In another example, if subsystem 925 transmits a communication with detectably incorrect information (i.e., an illegal communication), then bus controller terminal 930 may pass the illegal communication to BCPM 905, and logic within BCPM 905 may detect that the communication is illegal. This allows BCPM 905 to record the illegal communication (either the communication itself or details thereof or both), and/or preclude the communication from being acted upon or forwarded to bus controller terminal 915 or other remote terminal $RT_1$. Examples of illegal communications may include the following: a communication identifying itself as being transmitted from subsystem 910/remote terminal $RT_1$ when it is known by BCPM 905 that the communication is being transmitted from subsystem 925; or a communication identifying itself as being accompanied by, for example, 17 data words when it is accompanied by 16 or 18 data words.

While, in some embodiments, BCPM 905 is configured to block non-compliant communications, such as unwarranted and illegal communications, in other embodiments, bus controller terminal 930 may include logic to block such communications. For example, if subsystem 925 attempts to transmit an unwarranted or illegal communication to BCPM 905, bus controller terminal 930 may block the attempted communication and bus monitor 935 may record the attempted communication. Because, in this example, bus controller terminal 930 received a communication from subsystem 925 without first having recently received any command from BCPM 905, logic within bus controller terminal 930 determines that the communication from subsystem 925 is unwarranted. Using the determination, bus controller terminal 930 blocks any such non-compliant communication from subsystem 925. Further, bus monitor 935 is configured to record any attempted communication by subsystem 925. BCPM 905 may then retrieve information related to unwarranted or illegal communication from bus monitor 935 and determine when subsystem 925 attempted such a communication.

A person of ordinary skill in the art would also appreciate that in some embodiments, if subsystem 925 transmits an invalid communication (e.g., noise), then bus controller terminal 930 may not be able to read and parse the meaning from the invalid communication. Because there is no specific, actionable communication for bus controller terminal 930 to forward to BCPM 905, bus controller terminal 930 may block the invalid communication from being passed on to BCPM 905. Bus monitor 935 may also record the invalid communication or details of the invalid communication or both. Details may include duration and start time. Bus monitor 935 may also transmit details of the invalid communication to BCPM 905. Bus controller terminal 930 and bus monitor 935 may optionally be a single device, i.e., bus controller terminal 930 may record details of non-compliant communications and transmit the details to BCPM 905.

Figure 11:
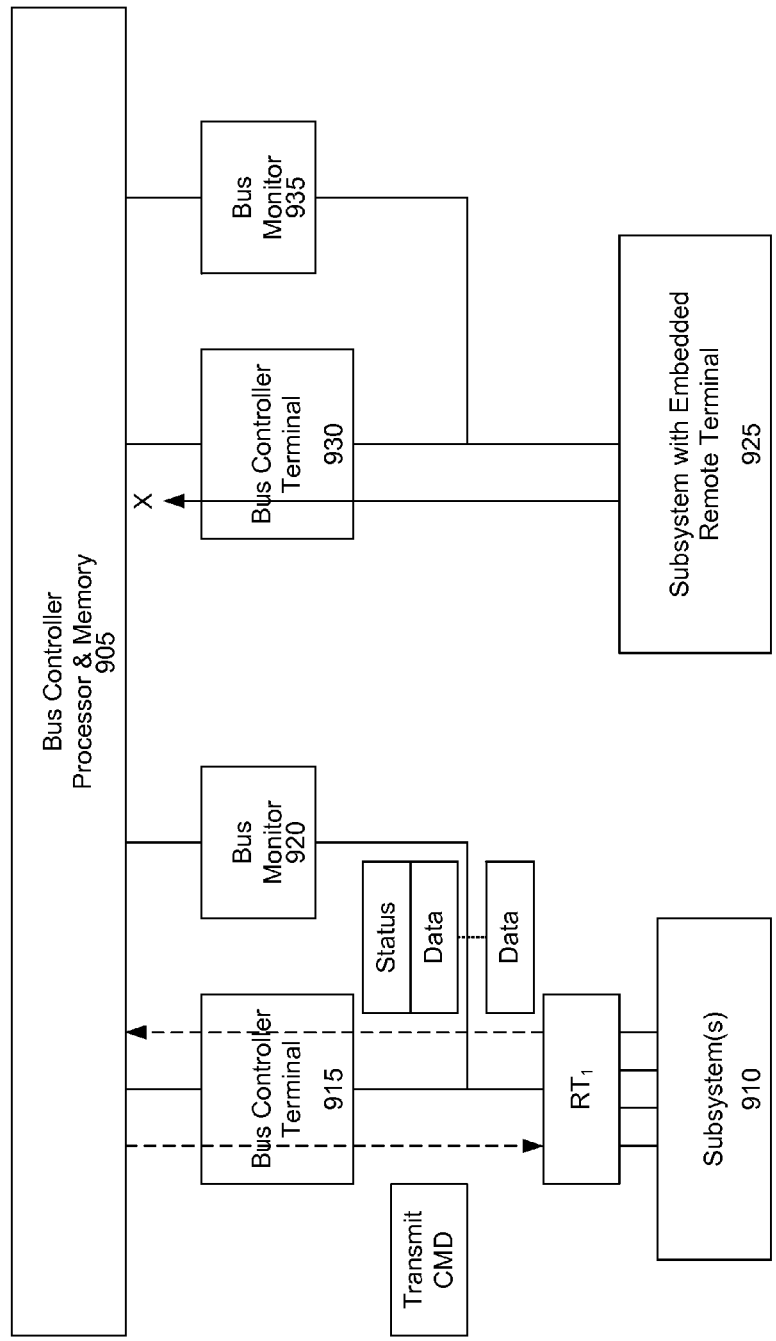
FIG. 11 is a block diagram illustrating a bus controller—remote terminal communication system for a remote terminal to transmit data words, according to an embodiment of the present invention.

FIG. 11 is a block diagram 1100 illustrating a bus controller—remote terminal communication system for a remote terminal to transmit data words, according to an embodiment of the present invention. In this embodiment, BCPM 905 sends a transmit command via bus controller terminal 915 to remote terminal $RT_1$. The transmit command instructs remote terminal $RT_1$ to transmit data words. In response, remote terminal $RT_1$ transmits the status word along with the data words to bus controller terminal 915. Bus controller terminal 915 transmits the status word along with the data words to BCPM 905. Bus monitor 920 monitors and records the information pertaining to the transmission of the data words. Similar to FIG. 10, if subsystem 925 issues a non-compliant transmission for BCPM 905, the transmission may be blocked by BCPM 905 or bus controller terminal 930 and recorded by bus monitor 935.

Figure 12:
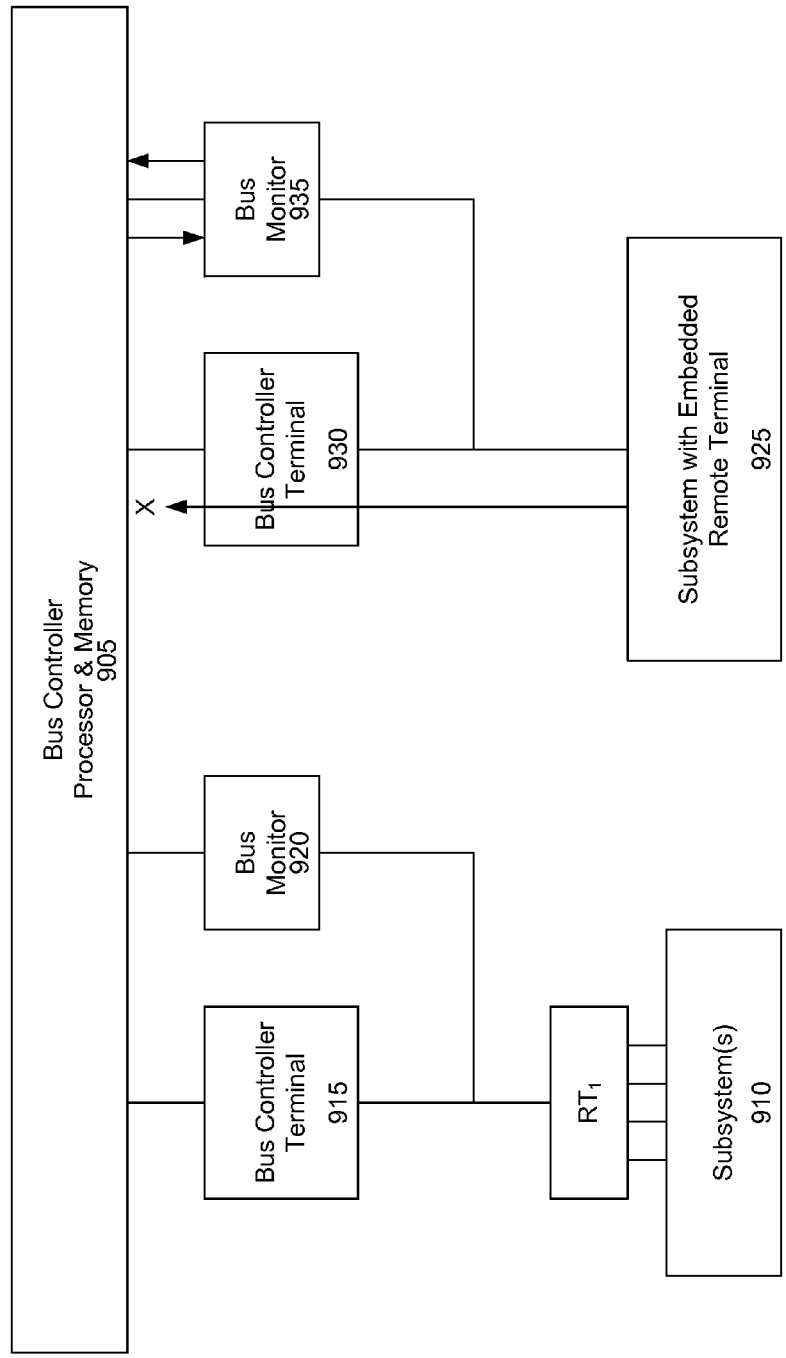
FIG. 12 is a block diagram illustrating a bus controller—remote terminal communication system for requesting information from a bus monitor, according to an embodiment of the present invention.

FIG. 12 is a block diagram 1200 illustrating a bus controller—remote terminal communication system for requesting information from bus monitor 935, according to an embodiment of the present invention. As discussed above, if subsystem 925 issues a non-compliant transmission for BCPM 905, the non-compliant transmission will be blocked by BCPM 905 or bus controller terminal 930. Details regarding the non-compliant transmission are also recorded by bus monitor 935.

BCPM 905 may transmit a request message to bus monitor 935 for activity information. This causes bus monitor 935 to respond with information pertaining to the activity related to subsystem 925. This activity may include, but is not limited to, the transmission of compliant information, non-compliant information, or both. In an alternative embodiment, bus monitor 935 may initiate communication to transmit information regarding the activity to BCPM 905.

Figure 13:
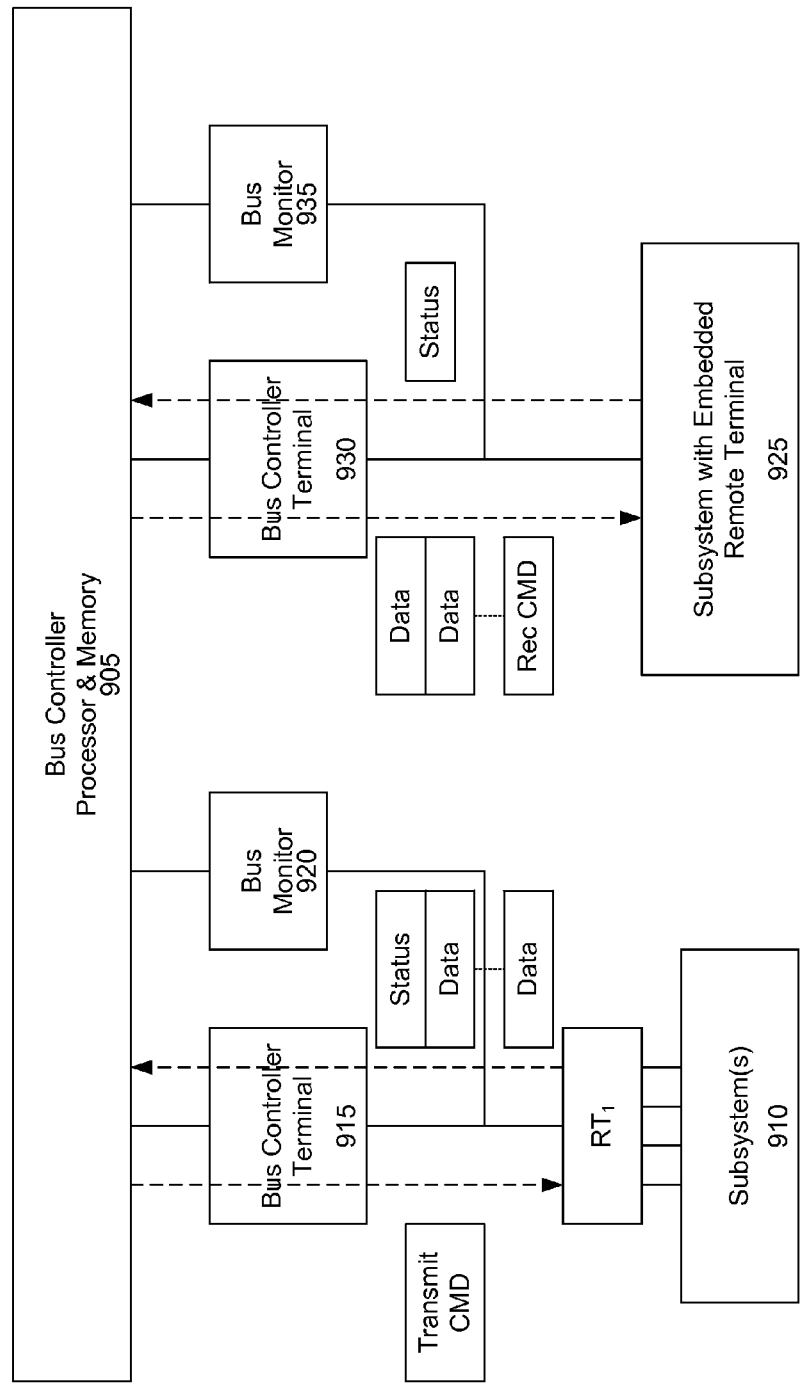
FIG. 13 is a block diagram illustrating a bus controller—remote terminal communication system for a remote terminal to transmit data words to another remote terminal, according to an embodiment of the present invention.

FIG. 13 is a block diagram 1300 illustrating a bus controller—remote terminal communication system for a remote terminal to transmit data words to another remote terminal, according to an embodiment of the present invention. In this embodiment, BCPM 905 sends a transmit command, via bus controller terminal 915, to remote terminal $RT_1$. Remote terminal $RT_1$, in response to receiving the transmit command, sends a status word along with data words intended for subsystem 925.

The status word and the data words pass through bus controller terminal 915 to BCPM 905. BCPM 905, upon receipt of the status word and the data words, sends a receive command, along with the data words, to subsystem 925 via bus controller terminal 930. When subsystem 925 receives the last data word, subsystem 925 sends a status word to BCPM 905 via bus controller terminal 930. During this process, bus monitor 920 records activity between bus controller terminal 915 and $RT_1$, and bus monitor 935 records activity between bus controller terminal 930 and subsystem 925.

It should be appreciated that bus controllers 915, 930, as described with respect to FIGS. 9-13, are configured to perform similar functions for mode commands and broadcast commands issued by BCPM 905. Mode commands are defined by MIL-STD-1553B as commands used to communicate with the multiplex bus related hardware and to assist in the management of information flow instead of being used to extract data from or feed data to a functional subsystem. Per FIG. 2, a mode command can be used to command a remote terminal to receive an accompanying data word or to transmit a data word in addition to a status word. Moreover, a mode command can be used without an accompanying data word at all.

Broadcast commands are used by a bus controller to simultaneously communicate with all remote terminals. Per FIG. 3, a broadcast command can be used to instruct all remote terminals to receive a plurality of data words from the bus controller, to receive a plurality of data words from a remote terminal, to receive a mode command from the bus controller, or to receive a mode command with an associated data word from the bus controller.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments, and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations that are different than those that are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a switch situated between a bus controller and a plurality of remote terminals, wherein
the switch is configured to block non-compliant 1553-compatible communication issued from at least one of the plurality of remote terminals or the bus controller,
the switch is further configured to receive a command issued by the bus controller and route the command to each of the plurality of remote terminals to provide an intended remote terminal with sufficient time to transmit a response within an expected response time, and
the switch is further configured to receive a plurality of data words issued by the bus controller and route the plurality of data words to each of the plurality of remote terminals to provide the intended remote terminal with sufficient time to transmit a status word to the bus controller within the expected response time.

2. The apparatus of claim 1, wherein the non-compliant 1553-compatible communication comprises unwarranted 1553-compatible communication, invalid 1553-compatible communication, illegal 1553-compatible communication, or any combination thereof.

3. The apparatus of claim wherein the command comprises
instructions for the intended remote terminal to receive data words from the bus controller or one of the plurality of remote terminals, or
a request for the intended remote terminal to transmit data words to the bus controller, to at least one of the plurality of remote terminals, or both.

4. The apparatus of claim 1, wherein the switch is further configured to read remote terminal address bits from the command to identify an intended remote terminal that is allowed to communicate with the bus controller.

5. The apparatus of claim 4, wherein the switch is configured to block the non-compliant 1553-compatible communication issued from the at least one of the plurality of remote terminals based on the command issued by the bus controller.

6. The apparatus of claim 4, wherein the switch is configured to route a status word, an optional plurality of data words, or both, issued by the intended remote terminal to the bus controller, at least one of the plurality of remote terminals, or both.

7. The apparatus of claim 1, wherein the switch is further configured to record in memory the non-compliant 1553-compatible communication, details regarding the non-compliant 1553-compatible communication, or both.

8. The apparatus of claim 7, wherein the switch is configured to transmit, upon request from the bus controller, information comprising the non-compliant 1553-compatible communication, the details regarding the non-compliant 1553-compatible communication, or both.

9. The apparatus of claim 1, wherein the switch is further configured to block transmission of at least one of a plurality of words to an unintended remote terminal, the at least one of the plurality of words is received from an intended remote terminal.

10. An apparatus, comprising:
a plurality of bus controller terminals, each of the plurality of bus controller terminals associated with a bus controller processor and memory (BCPM) and one of a plurality of remote terminals,
a plurality of bus monitors, each of the plurality of bus monitors associated with one of the plurality of bus controller terminals, wherein
at least one of the plurality of bus monitors is configured to record information pertaining to non-compliant 1553-compatible communication between an associated bus controller terminal and an associated remote terminal, and
each of the plurality of bus controller terminals is configured to isolate communication between the BCPM and each of the plurality of remote terminals, such that non-compliant 1553-compatible communication issued from at least one of the plurality of remote terminals is blocked.

11. The apparatus of claim 10, wherein at least one of the plurality of bus controller terminals is further configured to receive a command and an optional plurality of data words intended for an associated remote terminal and to transmit the command and the optional plurality of data words to the associated remote terminal.

12. The apparatus of claim 10, wherein at least one of the plurality of bus controller terminals is further configured to receive a status word and an optional plurality of data words from an associated remote terminal, and transmit the status word and the optional plurality of data words to the BCPM.

13. The apparatus of claim 10, wherein
at least one of the plurality of bus monitors is further configured to record information pertaining to compliant 1553-compatible communication between an associated bus controller terminal and an associated remote terminal.

14. The apparatus of claim 13, wherein the at least one of the plurality of bus monitors is further configured to receive a request from the BCPM for information related to the compliant 1553-compatible communication, the non-compliant 1553-compatible communication, or both, and to transmit the information to the BCPM in response to the request.

15. The apparatus of claim 13, wherein the at least one of the plurality of bus monitors is further configured to initiate transmission of information related to the compliant 1553-compatible communication, the non-compliant 1553-compatible communication, or both, to the BCPM.

16. The apparatus of claim 10, wherein the BCPM is configured to automatically block non-compliant 1553-compatible communication issued from an associated remote terminal, the non-compliant 1553-compatible communication comprises unwarranted 1553-compatible communication, illegal 1553-compatible communication, or both.

17. The apparatus of claim 10, wherein the bus controller terminal is configured to block non-compliant 1553-compatible communication issued from an associated remote terminal, the non-compliant 1553-compatible communication comprises unwarranted 1553-compatible communication, invalid 1553-compatible communication, illegal 1553-compatible communication, or any combination thereof.

18. The apparatus of claim 10, wherein the BCPM, the bus controller terminal, or both, are configured to block transmission of at least one of a plurality of words to an unintended remote terminal, the at least one of a plurality of words are received from an intended remote terminal.

19. The apparatus of claim 1, wherein the switch, the bus controller, and the plurality of remote terminals are arranged in a star topology, with the switch being located between the bus controller and the plurality of remote terminals to block the non-compliant 1553-compatible communication.

* * * * *